Figure 1:
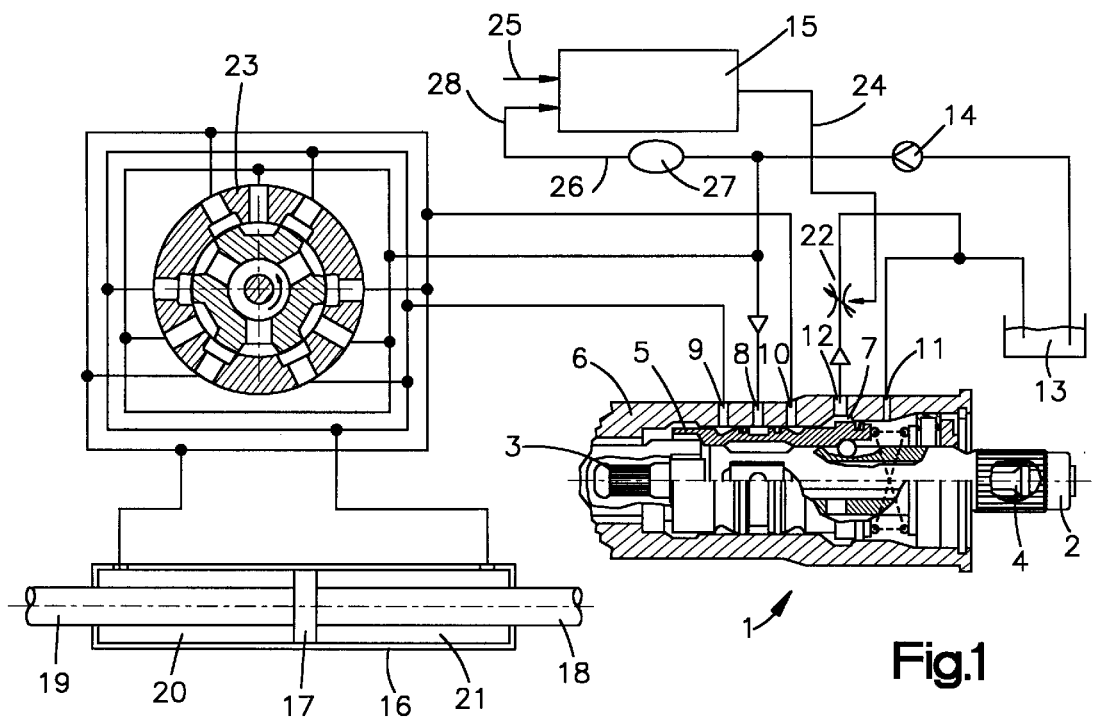

United States Patent
Eberhart

[11] Patent Number: 5,862,879
[45] Date of Patent: Jan. 26, 1999

[54] METHOD AND DEVICE FOR CONTROLLING THE HYDRAULIC PRESSURE IN A POWER STEERING SYSTEM

[75] Inventor: Eugen Eberhart, Düsseldorf, Germany

[73] Assignee: TRW Fahrwerksysteme GmbH & Co. KG, Dusseldorf, Germany

[21] Appl. No.: 734,595

[22] Filed: Oct. 22, 1996

[30] Foreign Application Priority Data

Oct. 31, 1995 [DE] Germany ............. 195 40 501.3

[51] Int. Cl.⁶ .................................................. B62D 5/083
[52] U.S. Cl. ............................................................. 180/422
[58] Field of Search ............................... 180/417, 421, 180/422, 423

[56] References Cited

U.S. PATENT DOCUMENTS

| | | | |
|---|---|---|---|
| 4,913,250 | 4/1990 | Emori et al. | 180/422 |
| 5,307,895 | 5/1994 | Duffy | 180/422 |
| 5,339,917 | 8/1994 | Eberthart . | |
| 5,392,875 | 2/1995 | Duffy | 180/417 |
| 5,396,969 | 3/1995 | Joerg et al. | 180/417 |

FOREIGN PATENT DOCUMENTS

| | | |
|---|---|---|
| 4201311 | 2/1993 | Germany . |
| 4242441 | 5/1994 | Germany . |
| 05262252 | 10/1993 | Japan . |

Primary Examiner—Kevin Hurley
Attorney, Agent, or Firm—Tarolli, Sundheim, Covell, Tummino & Szabo

[57] ABSTRACT

The invention discloses a method for controlling the hydraulic pressure in a power steering device that serves for supplying compressed oil to the left and the right chamber of a power steering cylinder via a rotary slide valve with the aid of a pump, wherein a reaction piston arranged on the input shaft in axially movable and rotationally rigid fashion and connected to the control sleeve of the rotary slide valve via an elastic rotary coupling is inserted between the input shaft and the control sleeve of the rotary slide valve, and wherein a hydraulic reaction device controlled by a control unit with dependence on speed and which serves to control the reaction pressure is arranged in a return line for the hydraulic medium which leads away from the reaction piston. According to the invention, the changes in the hydraulic pressure are determined and used as control parameters for the hydraulic reaction device that is controlled with dependence on speed in addition to the parameter speed.

17 Claims, 1 Drawing Sheet 005,862,879

METHOD AND DEVICE FOR CONTROLLING THE HYDRAULIC PRESSURE IN A POWER STEERING SYSTEM

BACKGROUND OF THE INVENTION

The present invention pertains to a method for controlling the hydraulic pressure in a power steering device that serves to supply compressed oil to the left and the right chamber of a power steering cylinder via a rotary slide valve with the aid of a pump, wherein a reaction piston arranged on the input shaft in axially movable and rotationally rigid fashion, connected to the control sleeve of the rotary slide valve via an elastic rotary coupling is inserted between the input shaft and the control sleeve of the rotary slide valve, and wherein a hydraulic reaction device controlled by a control unit with dependence on speed and which serves to control the reaction pressure is arranged in a return line for the hydraulic medium which leads away from the reaction piston. The invention additionally pertains to a power steering device for implementing said method.

Power steering devices of this type are generally known, e.g., from DE 42 42 441 C1. A hydraulic reaction device that is controlled with dependence on speed is arranged in a return line for the hydraulic medium that is arranged on the housing within the region of the reaction piston and leads either directly or indirectly to the reservoir for the hydraulic medium. In this case, the reaction device is a conventional solenoid valve controlled by a control unit with dependence on speed. When driving at slow speeds, e.g., during parking, the return pressure is increased with the aid of this speed-controlled solenoid valve such that the manual steering moment is reduced due to the retroeffect on the reaction piston.

One disadvantage of known methods or systems of this type can be seen in the fact that the increased return pressure also acts upon the seals of the steering rack, i.e., an undesirable increase in the steering rack restoring force results. In order to attain an essentially identical steering rack power level, it is necessary to adapt the undercarriage correspondingly.

One additional disadvantage of the increased return pressure can be seen in the inevitable increase in the oil temperature. In addition, an increased pressure is associated with severe noise problems.

Originating from this state of the art, the present invention is based on the objective of modifying a method for controlling the hydraulic pressure in a power steering device of the initially mentioned type in such a way that the most uniform steering rack power level possible is attained and an unnecessary increase in the oil temperature is simultaneously prevented. The invention additionally proposes a corresponding power steering device.

With respect to the method according to the invention, said objective is attained by determining the changes in the hydraulic pressure and utilizing these changes as control parameters for the hydraulic reaction device that is controlled with dependence on speed in addition to the parameter speed.

The invention proposes a simple control method in which the parameter change in hydraulic pressure is monitored in addition to the parameter speed. The changes in the system pressure are advantageously monitored.

In this case, one utilizes the increase in the system pressure once the rotary slide valve is activated. In the restoring state of the steering system, the rotary slide valve is moved into its neutral position and the system pressure drops to the respective reaction pressure defined by the control unit.

However, the reaction pressure that is controlled with dependence on speed is, in principle, only required for altering the activation moment of the rotary slide valve with dependence on speed. In this respect, the hydraulic reaction device that is controlled with dependence on speed, e.g., a solenoid valve, can be controlled such that the reaction pressure is only built up if the rotary slide valve is activated.

Consequently, the invention proposes to render the hydraulic reaction device controlled with dependence on speed ineffective if the determined system pressure drops or is identical to the reaction pressure. The system pressure is determined over a preset duration. If the dropping values are determined, the hydraulic reaction device controlled with dependence on speed is rendered ineffective. For this purpose, the invention proposes to bypass this device or, in the case of an electrohydraulic device, render the device without current.

However, if an increasing system pressure is determined, the hydraulic reaction device controlled with dependence on speed is activated.

In order to determine the system pressure, one embodiment of the invention proposes to utilize a pressure sensor. This pressure sensor is advantageously utilized for determining the system pressure in a corresponding line and connected to the control unit.

An alternative proposal of the invention pertains to the advantageous utilization of a proportional pressure regulator that, according to one embodiment of the invention, is arranged between a line that conveys the system pressure and a line that conveys the reaction pressure. In this case, the proportional pressure regulator is advantageously controlled by the system pressure.

The method according to the invention allows the simple activation of the hydraulic reaction device controlled with dependence on speed with dependence on the system pressure, i.e., an increased reaction pressure is only generated if the activation moment of the rotary slide valve actually needs to be changed.

With respect to the device, the aforementioned objective is attained with a power steering device that serves for supplying compressed oil to the left and the right chamber of a power steering cylinder via a rotary slide valve with the aid of a pump, wherein a reaction piston arranged on the input shaft in axially movable and rotationally rigid fashion and connected to the control sleeve of the rotary slide valve via an elastic rotary coupling is inserted between the input shaft and the control sleeve of the rotary slide valve, and wherein a hydraulic reaction device controlled by a control unit with dependence on speed and which serves to control the reaction pressure is arranged in a return line for the hydraulic medium which leads away from the reaction piston. This power steering device is characterized by a device for determining changes in the hydraulic pressure which are used for controlling the hydraulic reaction device controlled with dependence on speed.

The power steering device according to the invention is very suitable for use in connection with the aforementioned method. This power steering device is advantageously utilized for determining changes in the system pressure.

According to one embodiment of the invention, the power steering device consists of a proportional pressure regulator that is advantageously arranged between a line that conveys the system pressure and a line that conveys the reaction pressure and connected to an unpressurized return line. If this proportional pressure regulator is controlled by the system pressure, the proportional pressure regulator is opened when the rotary slide valve is in a neutral position, namely because the system pressure corresponds to the reaction pressure. Consequently, the hydraulic oil flows back to the reservoir in unpressurized fashion. However, if the rotary slide valve is activated, the system pressure is increased and the direct return of the oil to the reservoir is blocked via the proportional pressure regulator. Consequently, the oil is forced to flow via the solenoid valve that is controlled with dependence on speed, i.e., the power steering system is activated due to the increase in the reaction pressure.

An alternative embodiment of the invention proposes that the device for determining changes in the hydraulic pressure consist of a pressure sensor. This pressure sensor is advantageously arranged in a line that conveys the system pressure, and connected to the control unit. This control unit regulates the hydraulic reaction device that is controlled with dependence on speed, e.g., a solenoid valve, with dependence on speed as well as the changes in the system pressure.

The invention discloses a new power steering valve that is realized by simple modifications to generally known power steering valves and in which changes in the reaction pressure are only produced if required.

Additional advantages and characteristics of the invention are described below with reference to the figures. The figures show:

FIG. 1: a schematic representation of one embodiment of the invention, and

Figure 2:
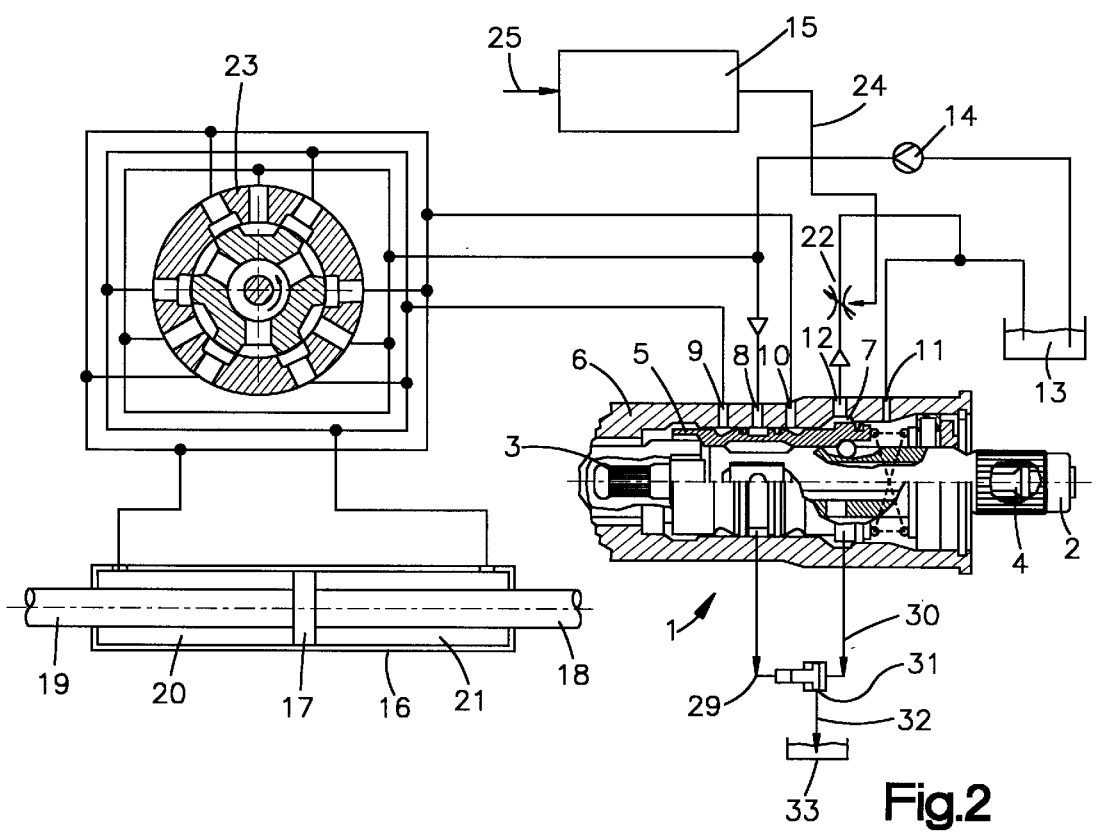

FIG. 2: a schematic representation of an alternative embodiment of the invention.

The basic designs of the power steering devices shown in FIGS. 1 and 2 are identical. Both power steering devices comprise identical elements that are identified by the identical reference numerals 1–25 and described in detail below.

The power steering valve 1 comprises an input shaft 2 and an output shaft 3, both of which are connected to one another by means of a torsion bar 4 and consequently can be turned relative to one another by a certain angle. A valve sleeve 5 is rigidly connected to the output shaft 3, i.e., the valve sleeve can also be turned relative to the input shaft 2. These elements are arranged in a housing 6, with a reaction piston 7 that cannot be turned relative to the input shaft 2 but that is axially displaced relative to said input shaft and prestressed by a spring in the embodiment shown being provided.

Hydraulic pressure is supplied to the system via a supply line 8. Depending on the steering deflection, the hydraulic pressure is supplied to the control lines 9 and 10 via control grooves or control bores arranged in the valve sleeve and the input shaft in order to activate the steering gear 16. Two return lines 11 and 12 are arranged on the front and the rear side of the reaction piston 7. The hydraulic medium is pumped into the circuit from a reservoir 13 by means of a pump 14 and returned into the reservoir 13. A control unit 15 controls a solenoid valve 22 arranged in the return line 12 with dependence on a speed signal 25.

When parking or driving at slow speed, the return pressure of the hydraulic medium is increased with the aid of the solenoid valve 22 that is controlled with dependence on speed so as to reduce the manual steering moment via the reaction piston 7.

The figures show a sectioned view 23, which serves as a functional diagram, as well as the schematic steering gear 16. If the input shaft is turned relative to the valve sleeve during the steering deflection shown in the figures, the control grooves are opened in such a way that hydraulic pressure is introduced into the left pressure chamber 20 of the steering gear 16, namely via the supply line 8 and the control line 10.

The steering gear 16 comprises the piston 17 with respective piston rods 18 and 19 arranged on both sides. Said piston divides the steering gear volume into two pressure chambers 20 and 21. The piston rod is moved with dependence on which side the pressure is introduced. In the embodiment shown, the piston rod moves toward the right in the plane of projection. Consequently, the right pressure chamber 21 and the control line 9 cause a return of the hydraulic medium via line 11 or 12, respectively. At slow speeds, the return pressure is increased via the solenoid valve controlled with dependence on speed as described previously. Consequently, this increased return pressure also acts upon the seals of the steering rack and causes an undesirable increase in the restoring force of the steering rack. Depending on the type of steering, this increase in power can amount to up to 50% of the usual value. In addition, the oil temperature as well as the noise development are increased.

In the embodiment shown in FIG. 1, a pressure sensor 27 is arranged in the system pressure supply line 8. A pressure signal 28 is fed to the control unit 15 via a control line 26. Consequently, the control unit receives the speed signal as well as the system pressure signal. The pressure signal is determined over a preset duration. The solenoid current is set to 0 if dropping pressure values were determined over a preset duration, with said solenoid current being dependent on the vehicle speed if the pressure values increase. Consequently, a change in pressure, which depends on the speed, only occurs if so required, namely for altering the activation moment of the rotary slide valve with dependence on speed. This activation leads to an increase in the system pressure, i.e., the previously described solenoid valve function becomes effective. In the neutral position, the system pressure drops to the reaction pressure defined by the control unit such that the solenoid valve function is deactivated by rendering the solenoid valve without current.

An alternative solution for a power steering valve of this type is shown in FIG. 2.

In this case, a proportional pressure regulator that is controlled by the system pressure is arranged between a line 29 that conveys the system pressure and a line 30 that conveys the reaction pressure. This pressure regulator comprises a return line 32 that leads to a reservoir 33. It goes without saying that this reservoir may correspond to the reservoir 13 and is only drawn as a separate element for reasons of better intelligibility.

When parking or driving at slow speeds while the rotary slide valve is activated, the system pressure is increased due to the activation of the rotary slide valve and the direct return of the oil to the reservoir is blocked by the proportional pressure regulator 31. Consequently, the oil is forced to flow via the solenoid valve that is controlled with dependence on speed. This causes the return of the oil to be blocked in accordance with the current amplification curve and speed, with said blockage of the hydraulic oil being used for controlling the steering moment.

When parking or driving at slow speeds while the steering valve is in the neutral position, the blocked reaction pressure in the reaction chamber and the system pressure are identical. Consequently, the proportional pressure regulator is opened by the reaction pressure due to the corresponding surface ratio and the oil is able to flow to the reservoir in an unpressurized state. This means that the solenoid valve is bypassed.

The solution shown in FIG. 2 is exceptionally cost-efficient.

List of reference numerals
1 Power steering valve
2 Input shaft
3 Output shaft
4 Torsion bar
5 Valve sleeve
6 Housing
7 Reaction piston
8 Supply line
9 Control line
10 Control line
11 Return line
12 Return line
13 Reservoir
14 Pump
15 Control unit
16 Steering gear
17 Piston
18 Piston rod
19 Piston rod
20 Pressure chamber
21 Pressure chamber
22 Solenoid valve
23 Sectioned view
24 Control line
25 Speed signal
26 Control line
27 Pressure sensor
28 Pressure signal
29 Pressure line
30 Pressure line
31 Proportional pressure regulator
32 Return line
33 Reservoir Having described the invention, the following is claimed:

1. Method for controlling the hydraulic pressure in a power steering device that serves for supplying compressed oil to the left and the right chamber (20, 21) of a power steering cylinder via a rotary slide valve (1) with the aid of a pump (14), wherein a reaction piston (7) arranged on the input shaft (2) in axially movable and rotationally rigid fashion and connected to the control sleeve (5) of the rotary slide valve via an elastic rotary coupling is inserted between the input shaft and the control sleeve (5) of the rotary slide valve, and wherein a hydraulic reaction device controlled by a control unit (15) with dependence on speed and which serves to control the reaction pressure is arranged in a return line for the hydraulic medium which leads away from the reaction piston (7), characterized by the fact that the changes in hydraulic pressure are determined and utilized as control parameters for the hydraulic reaction device controlled with dependence on speed in addition to the parameter speed, and characterized by the fact that the hydraulic reaction device controlled with dependence on speed is rendered ineffective if system pressure drops or corresponds to the reaction pressure.

2. Method according to claim 1, characterized by the fact that the hydraulic reaction device controlled with dependence on speed is bypassed.

3. Method according to claim 1, characterized by the fact that, in case of an electrohydraulic reaction device controlled by the speed, the reaction device is rendered ineffective by interrupting the current supply.

4. Method according to claim 1, characterized by the fact that the hydraulic reaction device controlled with dependence on speed is activated if the system pressure increases.

5. Method according to claim 1, characterized by the fact that the changes in the hydraulic pressure are determined by a pressure sensor (27).

6. Method according to claim 1, characterized by the fact that the pressure sensor values are fed to a control unit for the hydraulic reaction device that is controlled with dependence on speed.

7. Method for controlling the hydraulic pressure in a power steering device that serves for supplying compressed oil to the left and the right chamber (20, 21) of a power steering cylinder via a rotary slide valve (1) with the aid of a pump (14), wherein a reaction piston (7) arranged on the input shaft (2) in axially movable and rotationally rigid fashion and connected to the control sleeve (5) of the rotary slide valve via an elastic rotary coupling is inserted between the input shaft and the control sleeve (5) of the rotary slide valve, and wherein a hydraulic reaction device controlled by a control unit (15) with dependence on speed and which serves to control the reaction pressure is arranged in a return line for the hydraulic medium which leads away from the reaction piston (7), characterized by the fact that the changes in hydraulic pressure are determined and utilized as control parameters for the hydraulic reaction device controlled with dependence on speed in addition to the parameter speed, and characterized by the fact that a proportional pressure regulator is used for determining the changes in the hydraulic pressure.

8. Method according to claim 7, characterized by the fact that the proportional pressure regulator is arranged between a line that conveys the system pressure and a line that conveys the reaction pressure.

9. Method according to claim 7, characterized by the fact that the proportional pressure regulator is controlled by the system pressure.

10. Power steering device for supplying compressed oil to the left and the right chamber (20, 21) of a power steering cylinder via a rotary slide valve (1) with the aid of a pump (14), wherein a reaction piston (7) arranged on the input shaft (2) in axially movable and rotationally rigid fashion and connected to the control sleeve (5) of the rotary slide valve via an elastic rotary coupling is inserted between the input shaft and the control sleeve (5) of the rotary slide valve, and wherein a hydraulic reaction device controlled by a control unit (15) with dependence on speed and which serves to control the reaction pressure is arranged in a return line for the hydraulic medium which leads away from the reaction piston (7), characterized by a device for determining changes in the hydraulic pressure in order to control the hydraulic reaction device that is controlled with dependence on speed, and characterized by the fact that the device for determining the changes in the hydraulic pressure is a proportional pressure regulator (31).

11. Power steering device according to claim 10, characterized by the fact that the proportional pressure regulator (31) is arranged between a line that conveys the reaction pressure, and the proportional pressure regulator is connected to an unpressurized return line for the hydraulic medium.

12. Power steering device according to claim 10, characterized by the fact that the proportional pressure regulator (31) is controlled by the system pressure.

13. Power steering device for supplying compressed oil to the left and the right chamber (20, 21) of a power steering cylinder via a rotary slide valve (1) with the aid of a pump (14), wherein a reaction piston (7) arranged on the input shaft (2) in axially movable and rotationally rigid fashion and connected to the control sleeve (5) of the rotary slide valve via an elastic rotary coupling is inserted between the input shaft and the control sleeve (5) of the rotary slide valve, and wherein a hydraulic reaction device controlled by a control unit (15) with dependence on speed and which serves to control the reaction pressure is arranged in a return line for the hydraulic medium which leads away from the reaction piston (7), characterized by a device for determining changes in the hydraulic pressure in order to control the hydraulic reaction device that is controlled with dependence on speed, and characterized by the fact that the device for determining the changes in the hydraulic pressure is operable to activate the hydraulic reaction device when the system pressure increases and to render the hydraulic reaction device ineffective when the system pressure drops or corresponds to the reaction pressure.

14. Power steering device according to claim 13, characterized by the fact that the device for determining changes in the hydraulic pressure is a pressure sensor (27).

15. Power steering device according to claim 14, characterized by the fact that the pressure sensor is arranged in a line (26) that conveys the system pressure.

16. Power steering device according to claim 14, characterized by the fact that the pressure sensor is connected to a control unit (15).

17. Power steering device according to claim 16, characterized by the fact that the control unit (15) generates control signals with dependence on speed as well as changes in the system pressure.

* * * * *